United States Patent [19]
Mochizuki et al.

[11] Patent Number: 5,317,429
[45] Date of Patent: May 31, 1994

[54] TRILAYER NEMATIC LIQUID CRYSTAL OPTICAL SWITCHING DEVICE

[75] Inventors: Akihiro Mochizuki; Katsusada Motoyoshi, both of Kanagawa, Japan

[73] Assignee: Fujitsu Limited, Kawasaki, Japan

[21] Appl. No.: 798,968

[22] Filed: Nov. 27, 1991

[30] Foreign Application Priority Data
Nov. 28, 1990 [JP] Japan .................. 2-327518

[51] Int. Cl.$^5$ ............... G02F 1/13; G02F 1/1335; G02F 1/133; G02F 1/137
[52] U.S. Cl. ..................... 359/42; 359/53; 359/75; 359/94; 359/102
[58] Field of Search ............ 359/42, 75, 77, 102, 359/53

[56] References Cited

U.S. PATENT DOCUMENTS

| | | | |
|---|---|---|---|
| 3,991,241 | 11/1976 | Matsumoto et al. | 359/75 |
| 4,066,334 | 1/1978 | Fray et al. | 359/106 |
| 4,730,904 | 3/1988 | Pauluth et al. | 359/77 |
| 4,974,940 | 12/1990 | Asano et al. | 359/75 |
| 5,153,761 | 10/1992 | Marlov | 359/72 |

FOREIGN PATENT DOCUMENTS

| | | | |
|---|---|---|---|
| 0015139 | 9/1980 | European Pat. Off. | 359/42 |
| 57-147618 | 9/1982 | Japan . | |
| 61-20931 | 1/1986 | Japan . | |
| 62-032419 | 2/1987 | Japan | 359/42 |
| 62-127829 | 6/1987 | Japan . | |
| 2-4222 | 1/1990 | Japan . | |

OTHER PUBLICATIONS

Mochizuki et al., "An Electric Bilayer Model . . . Nematic Liquid Crystal Cell", Jap J. Appl. Phys. vol. 29 No. 2 Feb. 1990, pp. L322-L325.
Mochizuki et al., "A Ferroelectric Layer in a Cell Containing a Polar Molecular Mixture in Nematic and Isotropic Phases", Jap. J. Appl. Phys. vol. 29, No. 10, L1898-L1900.
Suinov et al., "Deflector Based on Frustrated Total Internal Reflection of Light", Sov. J. Quantum Electron 7(9), Sep. 1977, pp. 1146-1147.
Channin, "Optical Waveguide Modulation Using Nematic Liquid Crystal", Applied Phys. Lett. vol. 22, No. 8, Apr. 15, 1973, pp. 365-366.

Primary Examiner—William L. Sikes
Assistant Examiner—Ron Trice
Attorney, Agent, or Firm—Staas & Halsey

[57] ABSTRACT

An optical switching device comprising a first layer having a first refractive index and having a first side where a coherent light is to be entered into the first layer and a second side opposite the first side, second and third layers sandwiching the first layer, the second layer having a main surface, and electrodes sandwiching the second and third layers for applying a voltage between the second and third layers, wherein a refractive index of the second layer can be changed from second to third and from third to second refractive indexes by an electro-optical effect using the voltage, the second refractive index being larger than the third refractive index, wherein the coherent light entering the first layer is totally reflected by the second layer when the second layer has the second refractive index, and at least part of the coherent light is transmitted through the second layer toward the outside of the main surface of the second layer when the second layer has the third refractive index.

10 Claims, 6 Drawing Sheets

TRILAYER NEMATIC LIQUID CRYSTAL OPTICAL SWITCHING DEVICE

BACKGROUND OF THE INVENTION

Field of the Invention

The present invention relates to a novel optical switching device in which a light beam is guided through a layered structure and is emitted out of the main surface of the layered structure by a switching operation. This optical switching device can comprise two dimensionally arranged plural optical switching elements in a single body.

Description of the Related Art

Recently, together with an enlargement of information content, a densification and an acceleration of information treatment, there have been further developments and increased practical uses of optical technologies. The transmission and treatment (i.e., processing) of information employing light are particularly useful to high density information treatment, such as multi-mode communications and multi-mode switching, since they do not involve electromagnetic interference.

To perform such a treatment, an optical element, particularly an optical element in which a plurality of optical elements, for example a wave guide and an optical switching element, are formed in a single body, is inevitable and therefore various proposals have been made.

For example, there have been proposed and put into practical use optical switching elements or optical modulators in which titanium is diffused into a substrate of single crystal lithium niobate ($LiNbO_3$), a ferroelectric substance, thereby to form wave guides by the Ti-diffused layer and optical switching is effected by the presence or absence of an applied voltage using the electro-optical effect.

This type of optical switching device using a ferroelectric single crystal is promising because it has excellent environmental resistance and high speed switching characteristics.

However, the above optical switching device using a ferroelectric single crystal has problems in that manufacturing of the same is difficult and multi-mode treatment, by arranging a plurality of switching elements into a matrix form, is difficult.

SUMMARY OF THE INVENTION

The above problems are solved according to the present invention by providing an optical switching device comprising a first layer having a first refractive index, a first end surface at which a coherent light beam enters the first layer, a second end surface opposite the first end surface, and second and third layers which sandwich therebetween the first layer, the second layer having a main surface. Electrodes sandwiching the second and third layers provide for applying a voltage across the second and third layers, whereby the refractive index of the second layer can be changed from second to third, and from third to second, refractive indexes by an electro-optical effect produced by the applied voltage, the second refractive index being larger than the third refractive index, and whereby the coherent light entering into the first layer is totally reflected by the second layer when the second layer has the second refractive index and, further, at least part of the coherent light is transmitted toward and through the second layer and thereby to the outside (i.e., exterior) of the main surface of the second layer when the second layer has the third refractive index.

The optical switching device may further comprise means for inputting a light beam into the first (i.e., core) layer, means for detecting a light emitted from the device, and a power source for supplying a voltage to the electrodes.

The second and/or third layers are typically formed of a ferroelectric substance whose refractive index can be changed by the electro-optical effect.

In a preferred embodiment, the optical switching device according to the present invention is formed by a liquid crystal cell that comprises two transparent substrates, each having a transparent electrode and an alignment film laminated thereon, the two transparent substrates being arranged to face each other and being spaced apart by a gap therebetween, and a liquid crystal material filled in the gap, the liquid crystal material forming respective ferroelectric liquid crystal layers adjacent to the substrates and a normal dielectric liquid crystal layer in a central portion of said gap.

The transparent electrodes may be in the form of stripes and the substrates be arranged such that the transparent electrode stripes form an X-Y matrix, to thereby form a device comprising two dimensionally arranged multiple optical switching elements.

Further, a plurality of the optical switching devices of the present invention can be arranged into an assembly in which a light beam emitted from a main surface of one optical switching device enters into the first layer of another optical switching device, in which the entered light is further switched. The light from the first optical switching device may be sent to the second optical switching device through a glass fiber.

DESCRIPTION OF THE PREFERRED EMBODIMENTS

Figure 1:
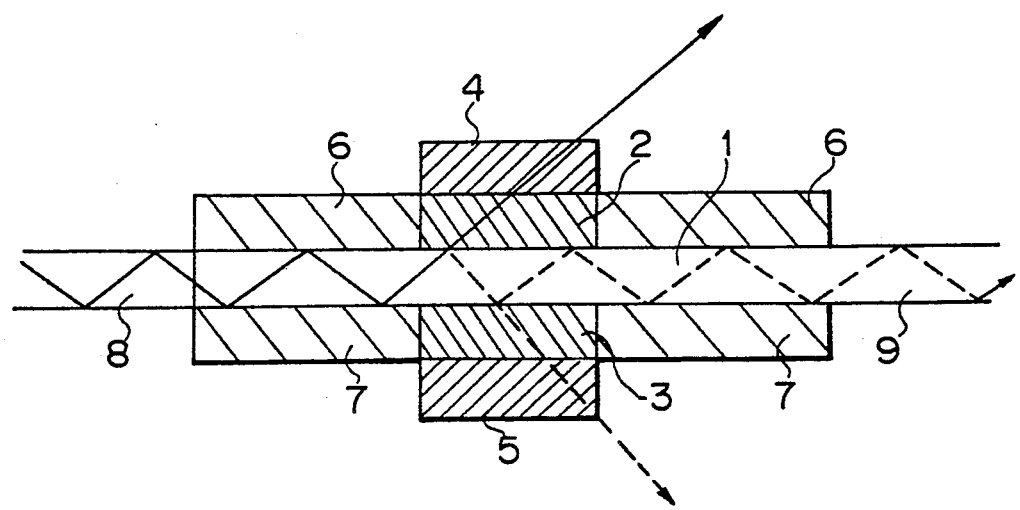
FIG. 1 shows the principle of the present invention.

FIG. 1 illustrates a principle of the present invention. In FIG. 1, an optical switching device comprises a first layer (i.e., a core layer) 1, second and third layers (cladding layers) 2 and 3, and electrodes 4 and 5. The second and third layers sandwich at least a portion of the first layer 1. When the second and third layers sandwich only a portion of the first layer 1 as in FIG. 1, the remaining portions of the first layer are sandwiched by fourth and fifth layers 6 and 7.

The first layer 1 has a first refractive index. The refractive index of the second layer 2 can be changed, by the electro-optical effect produced by a voltage applied thereto by the electrodes 4 and 5, from second to third and from third to second refractive indexes. For example, where the second refractive index is smaller than the third refractive index and when the second layer 2 has the second refractive index which is so low in comparison with the first refractive index, a coherent light beam in the first layer 1 is totally reflected by the second layer 2 as shown by the dashed lines in FIG. 1. Therefore, if the third layer 3 has a refractive index also small enough in comparison with the first refractive index to totally reflect the light beam in the first (core) layer 1 as shown by the dashed lines in FIG. 1, the light is transmitted or guided through the first layer 1. On the other hand, when the second layer 2 has the third refractive index, wherein the third refractive index is not small in comparison with the first refractive index so that a coherent light in the first layer 1 is not totally reflected at the interface with layer 2, the light beam is transmitted through the second layer 2 and to the outside (i.e., the exterior) of the main surface of the second layer 2 as shown by the solid line in FIG. 1. Thus, the light that enters the first layer 1 can be switched by the electro-optical effect from the direction defined by the respective main surfaces of the first and second layers 1 and 2 to the direction toward, and passing through to the outside (i.e., exterior) of, the second layer 2.

Simultaneously, the third layer 3 may be made such that the refractive index of the third layer 3 be changed by the electro-optical effect and in this case, the light entering the first layer can be switched from the direction defined by the respective main surfaces of the first and third layers 1 and 3 to the direction toward the outside (i.e., exterior) of the third layer 3. Further, if both the refractive indexes of the second and third layers 2 and 3 can be controlled, the light entering the first layer can be switched selectively in each of three ways, i.e., the direction parallel to the respective main surfaces of the first and second layers, the direction toward the outside (i.e., the exterior) of the second layer, and the direction toward the outside (i.e, the exterior) of the third layer.

If the second and third layers 2 and 3 sandwich only a portion of the first layer 1, the remaining portion(s) of the first layer 1 is (are) sandwiched by fourth and fifth layers 6 and 7, each having a refractive index so much lower than the first refractive index that the light in the first layer 1 is totally reflected by the fourth and fifth layers 6 and 7, as also shown by the dashed lines in FIG. 1. Thus, each such remaining portion of layer 1 including the fourth and fifth layers 6 and 7 thereon forms a wave guide.

Further, the second layer 2 and the fourth layer 6 may be made of the same material, wherein the refractive index thereof is the above second refractive index, i.e., so much lower than the first refractive index, such that the light beam in the first layer 1 is totally reflected by the second layer 2 when a voltage is not applied to the electrodes, and the refractive index of the second layer 2 can be changed by the electro-optical effect to a third refractive index, which is not low in comparison with the first refractive index, so that the light in the first layer 1 is not totally reflected and instead is transmitted through the second layer 2. The same conditions as above can be provided in the third and fifth layers 3 and 7. In these cases, the first layer 1 may be referred to as a core layer and the second to fifth layers 2, 3, 6 and 7 may be referred to as cladding layers.

Note that the refractive index of the second and/or third layers 2 and/or 3 may be changed when a voltage is applied or not applied and the changed refractive index may be maintained with or without an application of a voltage, in the present invention.

Figure 2:
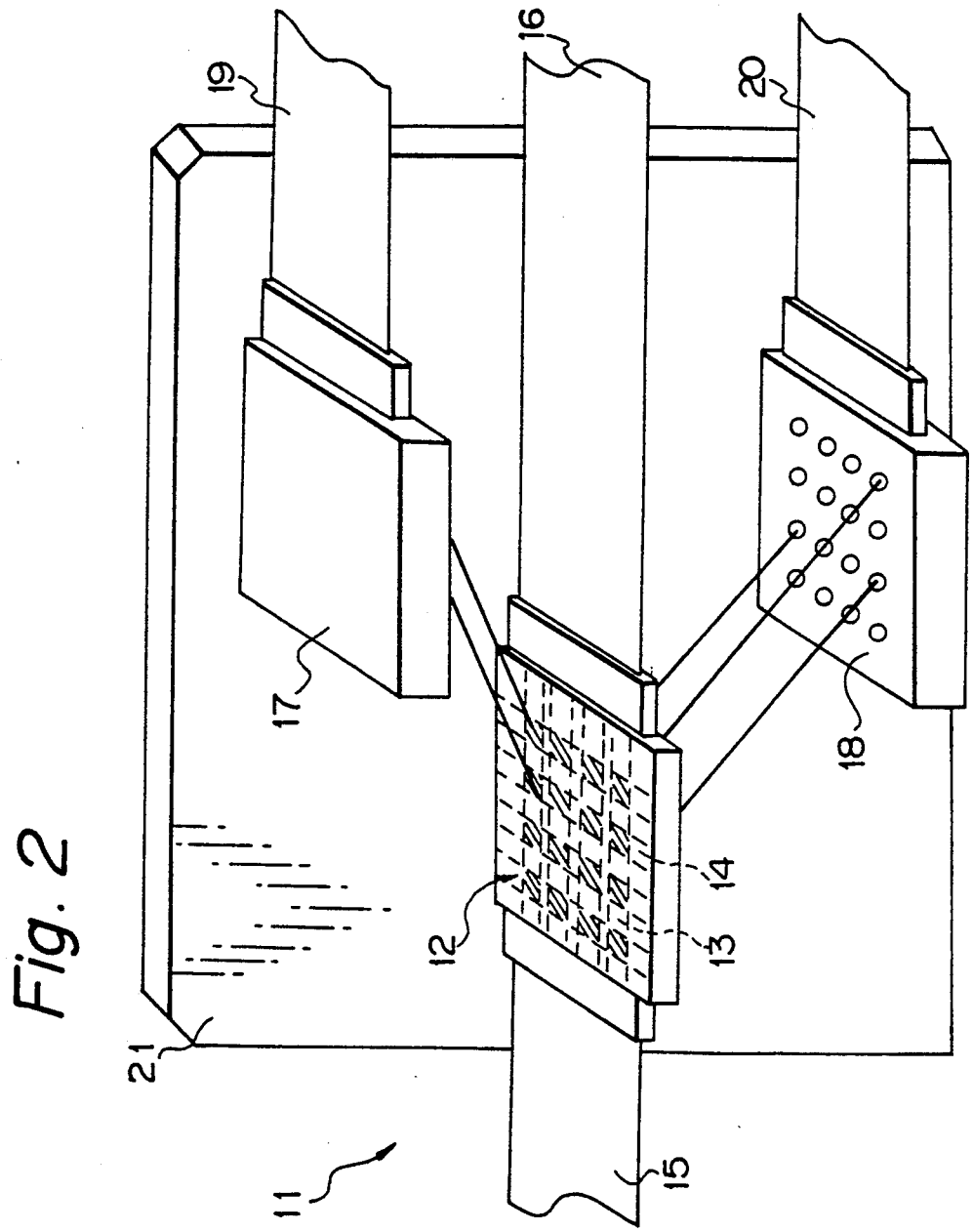
FIG. 2 is a schematic view of an example of a two dimensionally arranged multiple optical switching device.

FIG. 2 illustrates an example of an optical switching device according to the present invention. In this case, an optical switching device 11 has an optical switching element 12 which comprises, in addition to a core layer and cladding layers sandwiching the core layer, not shown, transparent electrodes 13 and 14 in the form of strips arranged to form an X-Y matrix, e g., a 4×4 matrix. The optical switching element 12 is connected with an optical fiber array 15 affording a four signal input. The optical fiber array 15 contains four optical fibers arranged corresponding to the lines of four parallel strips of a transparent electrode 13. The optical switching element 12 is also connected with another optical fiber array 16 affording a four signal output. The optical fiber array 16 contains four optical fibers arranged corresponding to the four parallel strips of a transparent electrode 13.

The optical switching element 12 has sixteen spots where the stripes of the transparent electrodes 13 and 14 are crossed and a light beam can be switched selectively in each of three directions of transmission.

The optical switching device 11 further has two photosensor arrays 17 and 18 each having sixteen photosensors that correspond to the sixteen spots of the electrode X-Y matrix of element 12. The photosensor arrays 17 and 18 need not be spatially separated from the optical switching element 12 and instead may be directly connected to the element 12. Further, as to the optical fibers or optical fiber arrays 15 and 16 connected to the element 12, each fiber corresponds to a respective spot where the associated transparent electrodes are crossed. The signal output may be an electrical conductor array, if desired, having a photosensor array that transforms the optical signals to respective electric signals.

The optical switching element 12 and the photosensor arrays 17 and 18 are supported by a support 21.

In the optical switching device of the present invention, the cladding layer may be any material whose refractive index can be changed by the electro-optical effect and is, for example, a ferroelectric substance such as $LiNbO_3$, $BaTiO_3$, $PbTiO_3$, $KNbO_3$, $LiTaO_3$, $PbNb_2O_6$, $PbTa_2O_6$, $NaBa_2(NbO_3)_5$, $Gb_2(MoO_4)_3$, $KSr_2(NbO_3)_5$ or the like.

The core layer may be made of a material that is a normal dielectric substance, for example, a resin having an appropriate refractive index in comparison with that of the cladding layers, for example, a refractive index of 1.60 to 1.20 if a ferroelectric substance such as lithium niobate is used for the cladding layers. Other examples of the transparent resin having a refractive index of 1.60 to 1.20 include poly (vinyl alcohol), poly (acrylonitrile), polycarbonate, etc.

Figure 3:
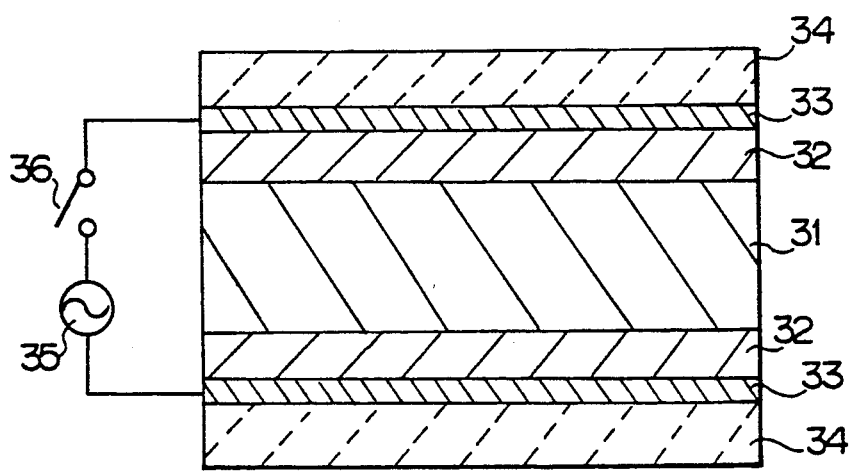
FIG. 3 is a sectional view of an example of the optical switching device according to the present invention in which a ferroelectric substance is used.

FIG. 3 shows an example of an optical switching device 12, such as in FIG. 2, in which 31 denotes a core layer of a normal dielectric substance, for example, a polyvinyl alcohol resin having a refractive index of 1.35 (several $\mu m$ thick), 32 cladding layers of a ferroelectric substance, for example, lithium niobate ($LiNbO_3$) having a refractive index of 2.20 (0.6 $\mu m$ thick), 33 transparent electrodes, 34 transparent substrates, 35 a power source, and 36 an electric switch. When a voltage of about 150 V is applied to the cladding layers 32 of a ferroelectric substance, the refractive index of the cladding layers 32 is changed, while polarized domains in the ferroelectric substance are reversed, to be approximately that of the core layer 31, to thereby change the direction of the propagation of a light beam.

In a most preferable embodiment of the present invention, the core layer and cladding layers are formed by a liquid cell.

Figure 4A:
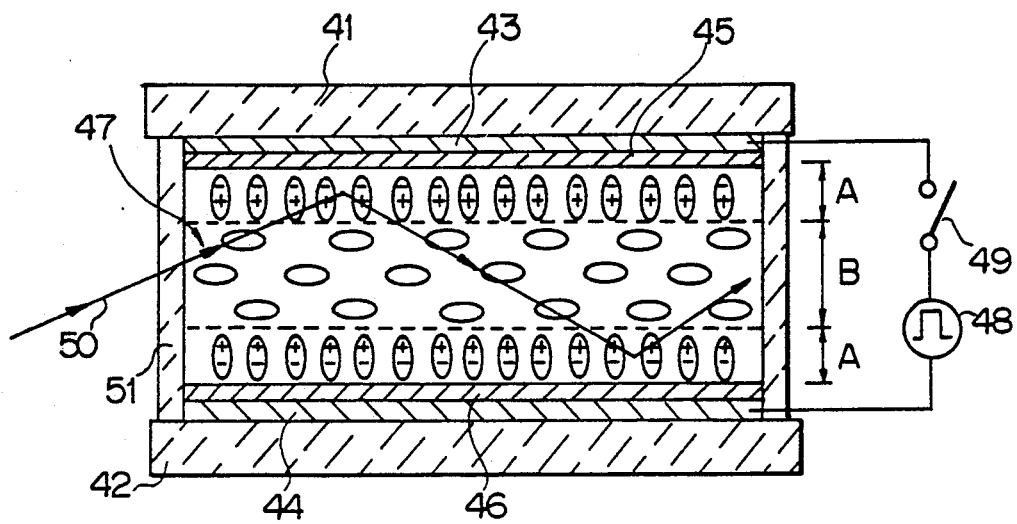
FIG. 4A and 4B show the principle of an optical switching device utilizing a particular liquid crystal.

The present inventors basically investigated the alignment of a nematic liquid crystal material adjacent to substrates in a liquid crystal cell and found that when a particular liquid crystal material and a particular liquid crystal molecular alignment film are used, the alignment of the liquid crystal is remarkably changed, as between portions adjacent to the respective substrates and a central portion displaced from and between, or intermediate, the substrates (Jap. J. Appl. Phys., Vol. 29, No. 2, L322-L325, Feb. 1990 and Jap. J. Appl. Phys., Vol. 29, No. 10, L1898-L1900, Oct. 1990). As shown in FIG. 4A, the liquid crystal molecules adjacent to the substrates are aligned vertically to the main surfaces of the substrates, and the liquid crystal molecules in the central portion between the substrates are aligned parallel to the main surfaces of the substrates.

Figure 4B:
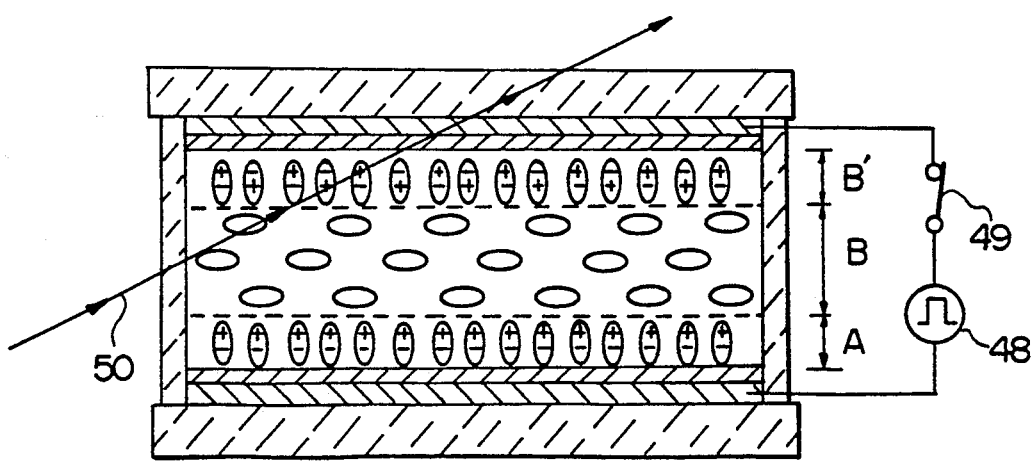

FIGS. 4A and 4B show the principle of the optical switching device using a liquid crystal cell in accordance with the present invention. FIG. 4A shows the cell when a voltage is not applied and FIG. 4B shows the cell when a voltage is applied. In FIGS. 4A and 4B, 41 and 42 denote transparent substrates, 43 and 44 transparent electrodes, 45 and 46 alignment films, 47 a liquid crystal material, 48 a power source and 49 an electric switch.

In FIG. 4A, i.e., when a voltage is not applied, if particular requirements as above are satisfied, the liquid crystal, that forms dimers in the central portion of the liquid crystal layer, in the portions adjacent the films 45 and 46 is separated into monomers by an interaction with the alignment films 45 and 46 and the monomers are aligned such that the negative pole ends of the monomers are in contact with the alignment films 45 and 46, to thereby form ferroelectric liquid crystal layers A. The liquid crystal material forming dimers in the central portion forms a normal dielectric liquid crystal layer B.

Recently, the present inventors further found that the ferroelectric liquid crystal layers A have a refractive index $n_A$ smaller than that of $n_B$ of the normal dielectric liquid crystal layer B. Therefore, if a light beam 50 is introduced into the liquid crystal layer A from a transparent side wall 51, the light beam 50 is transmitted or guided in the liquid crystal layer A while being totally reflected at the interface between the ferroelectric liquid crystal layers A and the normal dielectric liquid crystal layer B. Namely, the liquid crystal in the cell forms a light wave guide.

Then if the switch 49 is turned on, as shown in FIG. 4B, the polarity of a portion of the ferroelectric liquid crystal layer A is reversed, depending on the polarity of the voltage applied to the cell, immediately upon turning on the switch. For example, if the applied voltage is positive, a portion of the liquid crystal molecules in the layer B' is reversed in polarity. As a result, an average refractive index of the layer B' (FIG. 4B) is changed from $n_A$ of layer A (FIG. 4A), e.g., to be approximately equal to $n_B$, so that the light 50 is not totally reflected by the interface of the layers B and B' and is transmitted through the ferroelectric liquid crystal layer B', the transparent electrode 43 and the transparent substrate 41 and emitted out of the cell in the direction toward the outside, or exterior, of the main surface of the ferroelectric liquid crystal layer B' of the cell.

Figure 5:
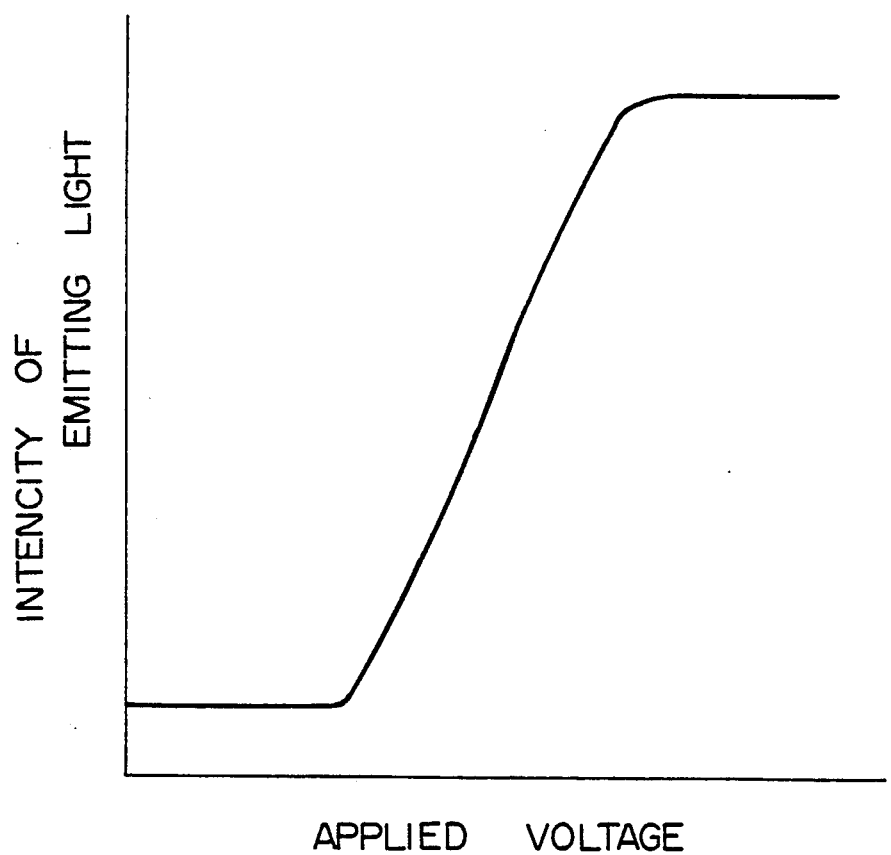
FIG. 5 is a graph showing the relationship between the voltage applied to the liquid crystal and the intensity of a light beam emitted from a liquid crystal cell.

FIG. 5 shows the intensity of the light emitted out of the main surface of the cell vs. the applied voltage. In general, the number of liquid crystal molecules that are reversed in polarization by the applied voltage increases with an increase of the magnitude of the applied voltage, but there is a threshold voltage, as shown in FIG. 5 and as exists in normal liquid crystal displays. Namely, until the applied voltage is increased to a certain voltage level, a transmitted light beam (i.e., a light beam transmitted through the layer B' as in FIG. 4B) is hardly obtained, but once the applied voltage exceeds the threshold voltage, the intensity of the transmitted light beam increases with an increase of the applied voltage and then, as also shown in FIG. 5, becomes saturated, for example, when all the ferroelectric liquid crystal molecules are reversed in polarity.

Thus, according to this embodiment, by a very simple construction, an optical switching device including a wave guide is made in a single body; particularly, an optical switching element array having a two dimensional matrix arrangement can be constructed, allowing parallel optical information treatment (i.e., processing). Moreover, since a liquid crystal cell is used, the optical switching device of this embodiment can be driven at a low voltage, e.g., as low as an operating voltage of C-MOS's, and can be manufactured at a low cost. Further, the technology of manufacturing devices using a large and high information content liquid crystal cell has been well established; for example, liquid crystal display devices having a large X-Y matrix of more than 640×400 dots are currently used.

Figure 6A:
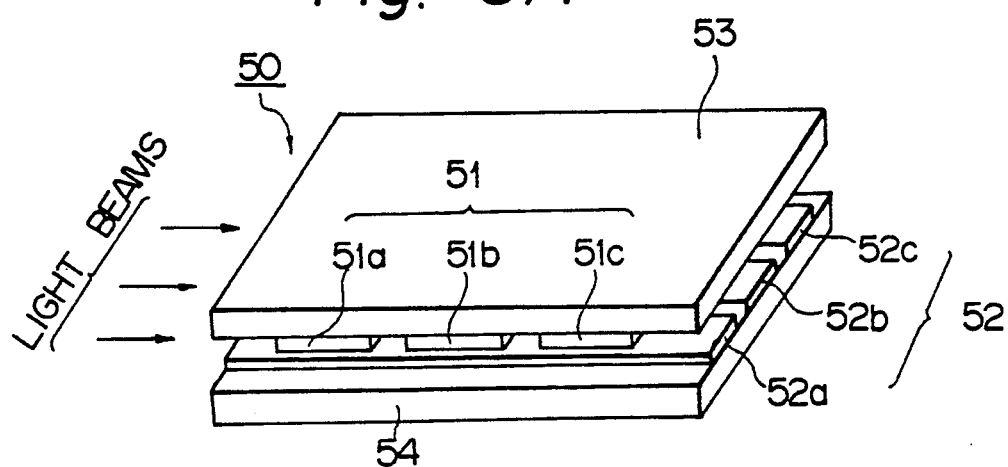
FIGS. 6A and 6B show the switching of light beams in an optical switching device utilizing a liquid crystal material and having 3×3 matrix electrodes.
Figure 6B:
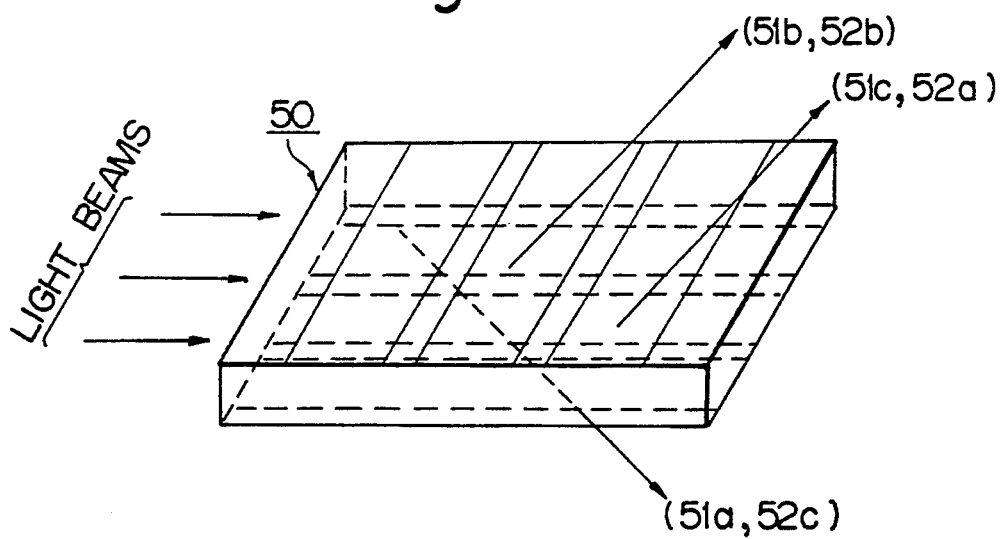

FIGS. 6A and 6B show an Example of the above embodiment, i.e., utilizing a liquid crystal cell. FIG. 6A shows a schematic construction of such a device 50 (3×3-matrix in this case) and FIG. 6B shows switching of light beams therein.

In FIG. 6A, 51a, 51b and 51c denote transparent electrodes, comprising three strips, for the input of a scanning voltage and 52a, 52b and 52c denote transparent electrodes, comprising three strips, for the input of a signal voltage. More specifically, each of the substrates 53 and 54 is made of a glass plate, and the transparent electrodes 51 and 52 are made of transparent conducting films of, e.g., indium tin oxide ($In_2O_3$-$SnO_2$), in the form of strips having a width of 5 mm and spaced by a gap of 2 mm, and are formed on the substrates 53 and 53.

On the transparent electrodes 51 and 52 and the substrates 53 and 54, alignment films (not shown) are formed, for example, by spin coating a polyamide film thereon, firing at about 250° C., and rubbing the surface of the film in a parallel direction relatively to the two films or in anti-parallel directions with respect to each other when the electrodes are arranged in the form of a matrix. Each alignment film preferably has a high surface polarity, particularly one that can separate a dimer to monomers; for example, a film made of a polymer having an alkylamine group that was fired. Other examples of useful alignment film materials include poly (vinyl alcohol), poly (amide imide), polyamide represented by nylone, poly (acry-lonitride), poly (vinyl pyridine), poly (pyrrolidone), poly (vinyl phenol), poly (vinyl acetate), and copolymers of these polymers.

The substrates 53 and 54 are spaced apart by a gap of 30 μm to form a cell.

The cell is filled with a liquid crystal material. An example of the liquid crystal material is a nematic liquid composition containing cyanobiphenyl as a main component. The preferred liquid crystal material to be filled in the cell is a liquid crystal capable of forming a dimer. The capability of forming a dimer can be predicted by the structure of the molecules thereof and the formation of a dimer can be detected experimentally by measuring the capacitance of the molecule in a cell. Examples of such liquid crystal materials include 4-alkyl-4-cyanobiphenyl such as 4-pentyl-4-cyanobiphenyl, 4-heptyl-4-cyanobiphenyl and 4-hexyl-4-cyanobiphenyl, 4-alkoxy-4-cyanobiphenyl, 4-alkyl-dioxane-4-cyanobenzene such as 4-pentyl-dioxane-4-cyanobenzene, 4-alkoxy-dioxane-4-cyanobenzene, 4-alkyl-4-flourobiphenyl such as flourobipenyl, 4-alkoxy-4-flourobiphenyl, etc. Of course, other liquid crystal materials and/or solvents may be employed.

The liquid crystal cell must have a transparent side wall or window onto which a light beam can be made incident.

In FIGS. 6A and 6B, if three beams are incident on the left side windows (not shown), the beams are guided in the liquid crystal layer and are emitted from the cell at the points where the transparent electrodes 51a to 51c and 52a to 52c are crossed, in accordance with respective voltages selectively applied thereto. As described with reference to FIGS. 4A and 4B, the optical switching is performed by a change of the index of refraction values of a ferroelectric liquid crystal layer A adjacent to the substrate, relatively to that of a normal dielectric layer B, when a voltage is selectively applied to the transparent electrodes. Depending on the position of the crossed electrodes and the polarity of the selectively applied voltages, the light beams may be emitted from the cell at any corresponding, selected point of the matrix and either upwardly, as shown by the beams emitted at the points (51b, 52b) and (51c, 52a) by the beam at the point (51a, 52c). Thus, this optical switching device is a 3×3 matrix-type optical switching device in which the liquid crystal layer is a wave guide and the light beam is emitted out of the device in the direction toward the outside (i.e., exterior) of a main surface of a liquid crystal layer of the cell.

When three light beams having a diameter of 20 μm were incident, in parallel, on the device and subject to optical switching, it was confirmed that a ratio of the intensity of the light beam, in the direction of a main surface of a cell and as between the ON and OFF conditions, was more than 50 to 1.

Figure 7:
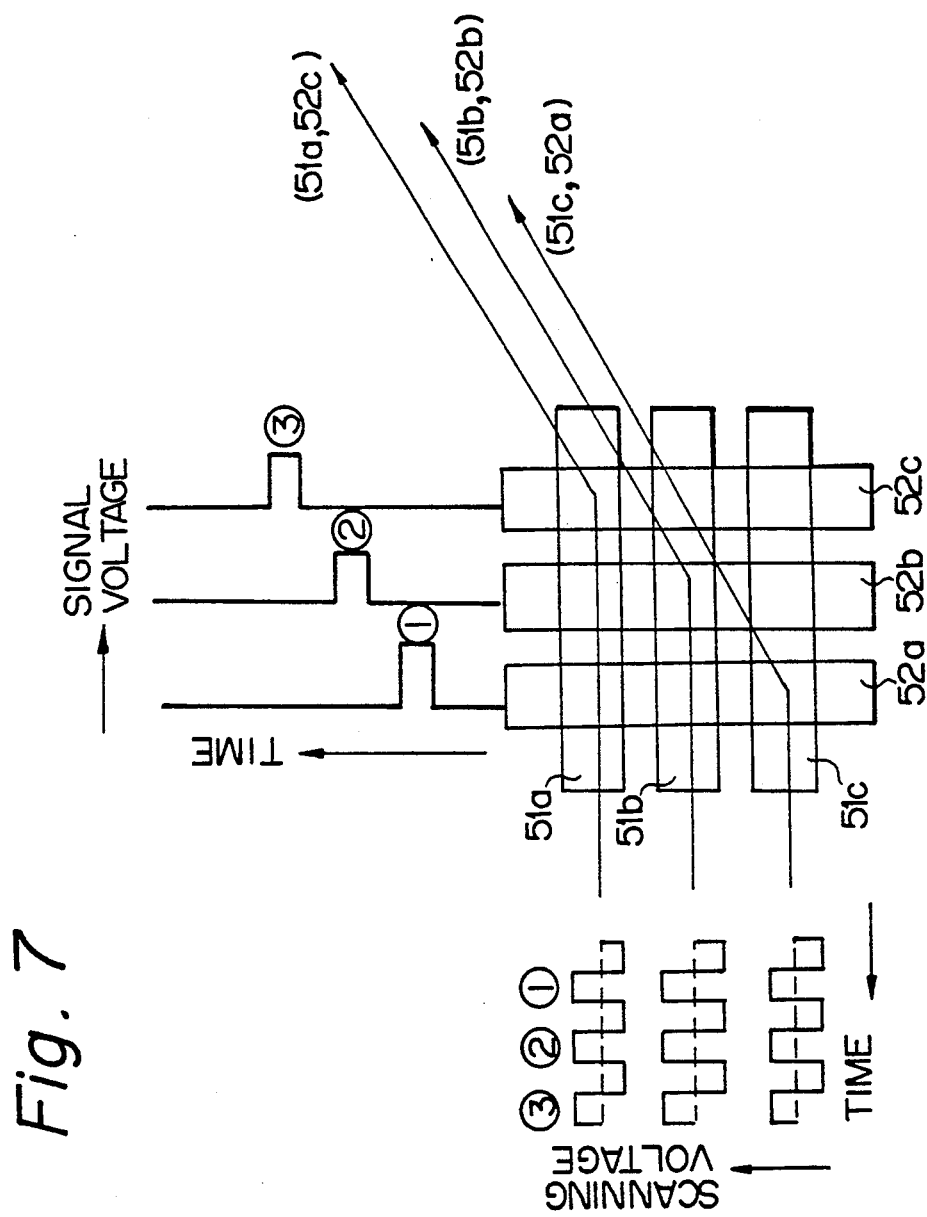
FIG. 7. is a schematic of the voltage drive arrangement of the optical switching device shown in FIGS. 6A and 6B.

FIG. 7 shows an example of driving the 3×3 matrix cell. For example and with reference also to FIGS. 6A and 6B, if scanning voltage pulses of ±2 V are applied to the transparent scanning electrodes 51 (51a, 51b, 51c) and signal voltages of ±18 V are applied to the transparent signal electrodes 52 (52a, 52b, 52c), synchronized with each of the pulses ①, ②, and ③, the selected voltages at the cross points (51a, 52c), (51b, 52b) and (51c, 52a) become +20 V and therefore the light beams are switched, upwardly in this example; however, the light beams at the other cross points, which are non-selected (0 V) or half selected (+16 V), are guided in the liquid crystal layer. Apparently, if the signal voltage is made −18 V at a selected cross point, the light beam at that cross point is switched in the opposite direction, i.e., downwardly.

Although the above example is a 3×3-matrix optical switching device, it is clear that an optical switching device having a larger matrix can be made by increasing the number of the strips of the transparent electrodes. Further, the materials and the structure may be appropriately modified within the spirit of the present invention.

Further, it is clear that a number of the optical switching devices may be assembled in multiple stages, thereby to process or switch the light beams in a corresponding number of stages.

We claim:

1. An optical switching device comprising:
   first and second transparent substrates having corresponding main surfaces and, further, with respective first and second transparent electrodes and first and second alignment films formed thereon, the first and second transparent substrates being disposed with the main surfaces in a facing, spaced relationship and defining a gap therebetween;
   first and second transparent end walls disposed in spaced and opposed relationship and extending between the respective main surfaces of the first and second transparent substrates;
   a nematic liquid crystal material, capable of forming a dimer, disposed in and filing the gap and defining a central layer separating first and second layers, the first and second layers being contiguous with and extending from the respective first and second alignment films to the central layer and defining corresponding first and second interfaces with the central layer, the first and second layers each exhibiting a ferroelectric characteristic and the central layer exhibiting a normal dielectric characteristic; and
   each of the first and second layers, in the absence of a voltage being applied to the respective first and second transparent electrodes, having a first index of refraction relative to the index of refraction of the central liquid crystal layer which results in total reflection of a coherent light beam, which is transmitted through the first transparent end wall and propagated in the central layer, at the respective interfaces of the first and second layers with the central layer, and each of the first and second layers, and having a second, different index of refraction relative to the index of refraction of the central layer in response to the application of an electrical voltage to the first and second transparent electrodes, such that at least a part of the coherent light beam, which is propagated through the central liquid crystal layer, is transmitted through a corresponding one of the first and second liquid crystal layers and through the respective, contiguous alignment film, transparent electrode and transparent substrate and thereby to the exterior of the respective transparent substrate.

2. A device as recited in claim 1, wherein:
   the first transparent electrode comprises a first plurality of spaced and parallel stripes on the first transparent substrate extending in one direction; and
   the second transparent electrode comprises a second plurality of spaced and parallel stripes on the main surface of the second transparent electrode extending in an orthogonal direction relative to the one direction, thereby defining an X-Y matrix of intersections of the first and second pluralities of stripes and each intersection corresponds to an optical switching element.

3. A device as recited in claim 2, further comprising:
means for selectively applying the voltage to selected ones of the first and second pluralities of stripes and thereby to the respectively corresponding optical switching elements.

4. A device according to claim 1 wherein said nematic liquid crystal material capable of forming a dimer is selected from the class consisting of 4-alkyl-4-cyanobiphenyl, 4-alkoxy-4-cyanobiphenyl, 4-alkyl-dioxane-4-cyanobenzene, 4-alkoxy-dioxane-4-cyanobenzene, 4-alkyl-4-fluorobiphenyl, and 4-alkoxy-4-flourobiphenyl materials.

5. A device according to claim 1 wherein each alignment film comprises a film of a material capable of separating the dimer.

6. A device according to claim 5 wherein each alignment film is a film having an anion radical.

7. A device according to claim 6 wherein the material of each alignment film comprises a polymer having an alkylamine group.

8. A device according to claim 5 wherein the material of each alignment film is selected from the class consisting of poly (vinyl alcohol), poly (amide imide), poly amide, poly (acrylonitrile), poly (vinyl pyridine), poly (pyrrolidone), and poly (vinyl acetate) materials and respective co-polymers of these materials.

9. An optical switching system comprising: first and second optical switching devices, each device comprising:
first and second transparent substrates having corresponding main surfaces with respective first and second transparent electrodes and first and second alignment films formed thereon, the first and second transparent substrates being disposed with the main surfaces in a facing, spaced relationship and defining a gap therebetween,
first and second transparent end walls disposed in spaced and opposed relationship and extending between the respective main surfaces of the first and second transparent substrates,
a nematic liquid crystal material, capable of forming a dimer, disposed in and filing the gap and defining a central layer separating first and second layers, the first and second layers being contiguous with and extending from the respective first and second alignment films to the central layer and defining corresponding first and second interfaces with the central layer, the first and second layers each exhibiting a ferroelectric characteristic and the central layer exhibiting a normal dielectric characteristic, and
each of the first and second liquid crystal layers, in the absence of a voltage being applied to the respective first and second transparent electrodes, having a first index of refraction relative to the index of refraction of the central liquid crystal layer which results in total reflection of a coherent light beam, which is transmitted through the first transparent end wall and propagated in the central layer, at the respective interfaces of the first and second layers with the central layer, and each of the first and second layers having a second, different index of refraction relative to the index of refraction of the central layer in response to the application of an electrical voltage to the first and second transparent electrodes, such that at least a part of the coherent light beam, which is propagated through the central liquid crystal layer, is transmitted through a corresponding one of the first and second liquid crystal layers and through the respective, contiguous alignment film, transparent electrode and transparent substrate and thereby to the exterior of the respective transparent substrate; and the second optical switching device being positioned relatively to the first optical switching device for receiving, through the first end wall and within the central layer of the second optical switching device the coherent light beam transmitted through the first transparent substrate of the first optical switching device.

10. An optical switching system as recited in claim 9, further comprising:
a third optical switching device positioned relatively to the first optical switching device for receiving through the first end wall and within the central layer of the third optical switching device, a coherent light beam transmitted through the second transparent substrate of the first optical switching device.

* * * * *

UNITED STATES PATENT AND TRADEMARK OFFICE
CERTIFICATE OF CORRECTION

PATENT NO. : 5,317,429
DATED : May 31, 1994
INVENTOR(S) : MOCHIZUKI et al.

It is certified that error appears in the above-indentified patent and that said Letters Patent is hereby corrected as shown below:

TITLE PAGE: [75] Inventors: after "Mochizuki" insert --, Atsugi--, after "Motoyoshi" insert --, Yokohama--, and delete "Kanagawa".

Col. 7, line 40, after "(51c, 52a)" insert --or downwardly, as shown--.

Col. 8, line 15, delete "and, further,";
line 47, delete ", and".

Col. 9, line 29, after "comprising:" begin a new paragraph with "first...".

Col. 10, line 30, after "and" begin a new paragraph with "the second...";
line 34, after "device" insert --,--;
line 40, after "receiving" insert --,--.

Signed and Sealed this

Thirteenth Day of December, 1994

Attest:

BRUCE LEHMAN

Attesting Officer    Commissioner of Patents and Trademarks